L. HULL.
Coffee-Huller.
No. 217,875.  Patented July 29, 1879.
Fig. 1.
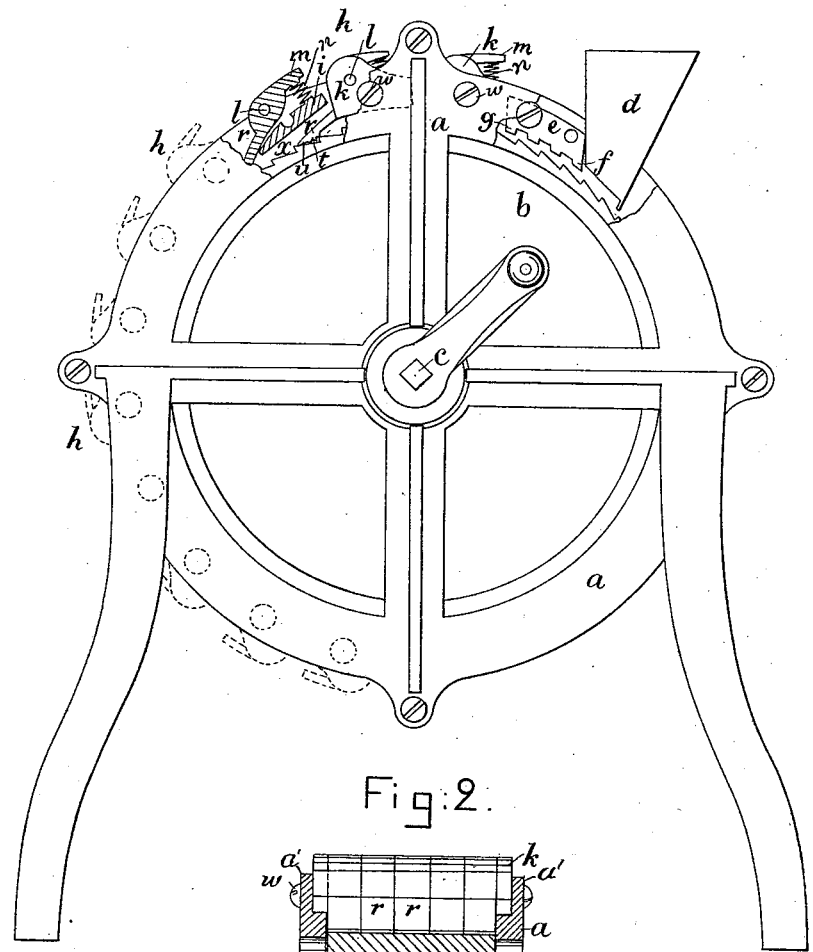
Fig. 2.
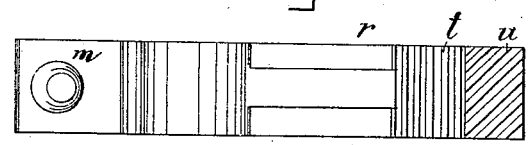
Fig. 3.
Witnesses.  Inventor.
Jos. P. Livermore  Liverus Hull
Lawrence F. Connor.  by Crosby & Gregory
  Attys

UNITED STATES PATENT OFFICE.

LIVERUS HULL, OF BOSTON, MASSACHUSETTS.

IMPROVEMENT IN COFFEE-HULLERS.

Specification forming part of Letters Patent No. 217,875, dated July 29, 1879; application filed May 10, 1879.

*To all whom it may concern:*

Be it known that I, LIVERUS HULL, of Boston, county of Suffolk, State of Massachusetts, have invented an Improvement in Coffee-Hullers, of which the following description, in connection with the accompanying drawings, is a specification.

My invention relates to machines for cracking and removing the hulls from coffee-berries, and then rubbing the berries to thereby remove the integuments from and polish them, and is an improvement upon the machine described in Letters Patent No. 170,383, dated November 23, 1875.

In the machine there described the shells of the berries were broken and the berries rubbed between a vertical revolving serrated cylinder and a series of broad-faced corrugated segmental plates, which were so broad that one or more large berries under them would lift them so far from the said revolving cylinder as to leave an open space for the passage of the smaller berries without being acted upon by the said plate, and in some cases even their shells were not broken.

In my improved machine the berries are received from a suitable hopper at the periphery of a serrated wheel or cylinder revolving on a substantially horizontal axis, and their hulls cracked by a series of rigid cracking bars or projections extending across the surface of the wheel, beginning from the hopper. The berries then pass to a series of rows of independent rubbers placed around the surface of the wheel, the said rows being parallel to the axis of the wheel, and the rubbers being of such size as to rub substantially one berry at a time, and being pivoted and pressed toward the wheel by springs.

Sufficient space is left between the different rows of rubbers to permit the berries to turn over, and thereby present a new surface to be rubbed by the next rubber.

The invention consists in the peculiar formation and arrangement of the rubbers, as hereinafter claimed.

Figure 1 shows, in side elevation, my improved coffee-huller, parts of the frame being broken away, and one of the rows of rubbers being shown in section. Fig. 2 is a front view of a row of rubbers, showing also part of the frame and part of the wheel in section; and Fig. 3 is a view of the rubbing-face of one of the rubbers, enlarged.

The frame $a$ is of suitable form to support the working parts.

The wheel or cylinder $b$ on shaft $c$, rotated in any usual manner, is provided at its periphery with suitable corrugations to carry forward the coffee-berries, which are introduced from the hopper $d$.

The berries, when received upon the surface of the wheel, are first carried by it under the series of rigid cracking-bars $e$, (here shown as projecting portions on a cast plate.) These bars are so placed that the one, $f$, nearest the hopper is most remote from the surface of the wheel $b$, and consequently cracks the shells of only the largest berries, the two separate berries from such shell then passing readily under the other bars. Each consecutive bar is placed nearer the wheel until the last one, $g$, of the series is near enough to crack the shell of the smallest berries. The separated berries, with the broken shells, next pass under the series of rows of rubbers $h$, which surround the wheel, to its lowest portion, where the polished berries and broken shells drop, and may be separated in any suitable manner. Each row of rubbers is pivoted to a frame consisting of a plate, $i$, provided at its ends with suitable ears or lugs $k$ to maintain the pivot $l$, which passes through the whole row of rubbers $r$, the said lugs being of proper shape to fit upon the flange $a'$ (see Fig. 2) of the frame $a$, to which the lugs are attached by screws $w$ in any suitable manner, as herein shown. Each rubber $r$ is provided with a portion, $m$, extending back from the pivot $l$, and a spring, $n$, is provided between the portion $m$ and the plate $i$, the said spring pressing with a yielding force the rubber against the wheel $b$ or a coffee-berry between it and said wheel.

Space is left, as at $x$, between the rows of rubbers, to allow the berries to turn over, so as to present a new surface to be acted on by the rubber of the next row.

The rubbers $r$, which are of such width as to act on substantially only one berry at a time, are provided with a convex series, $t$, of transverse and a flat series of diagonal corrugations, such arrangement being found to be very effective in rubbing and turning the berries.

The portion *i* of the frame between the acting ends of the rubbers also prevents the berries from being thrown outward.

I claim—

1. The serrated wheel of a coffee-huller, in combination with the rubber herein described, provided with a rubbing-head, consisting of a convex portion provided with transverse ridges and a flat portion provided with diagonal ridges, substantially as described.

2. The combination of the serrated wheel *b* with the plates *i*, which support the series of independent spring-rubbers, these members being set at such distance apart as to make a space, in which the berries are turned between each progressive series of rubbers, substantially as specified.

In testimony whereof I have signed my name to this specification in the presence of two subscribing witnesses.

LIVERUS HULL.

Witnesses:
G. W. GREGORY,
N. E. WHITNEY.